United States Patent [19]
Fukugami et al.

[11] 3,733,952
[45] May 22, 1973

[54] AUTOMATIC CONTOUR MACHINE

[75] Inventors: Goro Fukugami, Sagamihara-shi; Chiaki Tamura, Ono-shi; Masayuki Taguchi, Tokyo; Kenichi Maekawa, Kasai-shi, all of Japan

[73] Assignee: Amada Company Limited, Isehara-shi, Kanagawa-ken, Japan

[22] Filed: Feb. 12, 1971

[21] Appl. No.: 114,950

[30] Foreign Application Priority Data

| Feb. 18, 1970 | Japan | 45/13467 |
| June 17, 1970 | Japan | 45/51849 |
| June 17, 1970 | Japan | 45/51884 |
| June 23, 1970 | Japan | 45/54060 |
| July 22, 1970 | Japan | 45/63527 |
| Oct. 22, 1970 | Japan | 45/104299 |
| Dec. 3, 1970 | Japan | 45/106337 |

[52] U.S. Cl. ............83/789, 83/812, 83/818, 83/820, 83/442, 83/565
[51] Int. Cl. ....B23d 53/06, B23d 53/08, B27b 13/04
[58] Field of Search............83/201, 201.14, 201.15, 83/789, 820, 812, 818, 442; 143/17 R, 20, 26 B, 160, 17 C, 17, 26

[56] References Cited

UNITED STATES PATENTS

| 3,556,177 | 1/1971 | Cleland | 83/201 |
| 2,090,195 | 8/1937 | Grob | 143/17 E |
| 2,664,118 | 12/1953 | Krumbach | 83/201.14 |
| 2,774,131 | 12/1956 | Crane | 83/201.15 |
| 3,259,155 | 7/1966 | Kawabata | 83/201 |

FOREIGN PATENTS OR APPLICATIONS

| 1,204,114 | 9/1970 | Great Britain | 83/201 |

*Primary Examiner*—Donald R. Schran
*Attorney*—Cecily L. Frey

[57] ABSTRACT

Contour machine in which a worktable is fixed, and enclosed wheels are provided for mounting a band saw, the machine being pivotable with respect to a base, and in which a rotary table, mounted on the worktable, may be automatically set into rotation in the forward or reverse direction or stopped through a curve-sensing guide mechanism. The machine body is pivotable with respect to the base in a plane perpendicular to the face of the band saw, together with upper and lower housings which lodge wheels for guiding the band saw. The machine has means to provide an adjustable and reproducible relationship of the body with respect to the base, as well as means for immobilizing the pivoted machine body in various positions. In addition, with a view to attaining savings in manpower and automation of operation, units are provided for indication of the saw tension, for bringing a saw-container housing to a saw-mounting position, for clamping the saw for adjusting the relative distance between a workpiece and a saw-blade guide mechanism, and a unit for stopping the saw movement upon completion of the machining operation.

10 Claims, 23 Drawing Figures

AUTOMATIC CONTOUR MACHINE

This invention relates in general to a metal cutting machine, and more particularly to a machine adapted for machining or shaping a trimming die, wherein the workpiece is to be advanced precisely along a predetermined path with respect to the band saw or similar cutting tool.

An object of this invention is to provide a machine wherein the worktable with the work secured thereto is fixed and maintained at all times in the horizontal position and the machine proper, having enclosed saw wheels mounting a cutting tool or a band saw, can be tilted relative to the worktable or secured as desired at the titled position, thereby effecting the forward and cross movements of the work under the uniform external force, and enabling the automation of the profiling operation.

Another object of this invention is to provide a machine of the above kind in which a rotary table is mounted on the worktable through the device back forth enabling forced fore and aft movement and an unrestrained left and right movement thereof with respect to the saw running direction, and in which the rotary table can be automatically set into rotation in the forward and reverse direction or stopped through a curve-sensing guide mechanism.

A further object of this invention is to provide a machine of the above kind in which the sensing of the curved passage is performed through a feeler needle, and the forward and reverse rotation of the rotary table is controlled through the feeler needle sensing the contour of a template stuck to the worktable, thereby enabling automatic cutting operation.

A further object of this invention is to provide a machine of the above kind in which a spring means is clampedly held between the driven wheel mounted slidably within the machine frame and its support base, and the saw tension may be indicated in function of the elastic deformation caused to said spring means, thereby facilitating the saw tensioning operation.

A further object of this invention is to provide a machine of the above kind in which a housing capable of containing a desired number of band saws is mounted on some portion of the machine for easy storage and movable to some suitable position close to the saw cutter at the time of the saw cutting operation, thereby facilitating saw cutting and enabling an instrument to be used for measuring the required length of the saw.

A further object of the present invention is to provide a machine of the above kind wherein an upper saw guide mechanism is mounted so as to be adjustable vertically, back and forth or in a direction parallel to the saw width, and left or right or in a direction towards and away from the saw surface, and in which the saw holder means thereof are finely adjustable back and forth or in a direction parallel to the saw width, for enabling the clamping width to be adjusted in function of the width of the saw employed.

A further object of this invention is to provide a machine of the above kind wherein a lower saw-guide mechanism is mounted beneath the worktable and made to be adjustable in the same way as described before, that is vertically, back and forth and left and right, thereby enabling the relative distance between it and the lower surface of the work to be adjusted as desired.

A still further object of this invention is to provide a machine of the above kind wherein a button-actuated electric switch is mounted on the top of the lower saw-guide mechanism whereby the machine operation can be stopped automatically upon completion of the cutting operation.

These and other objects, features and advantages of this invention will become apparent from the following description, the appended claims and the accompanying drawings, wherein

The contour machine of the present invention is shown generally at 10 in the accompanying drawings.

Figure 1:
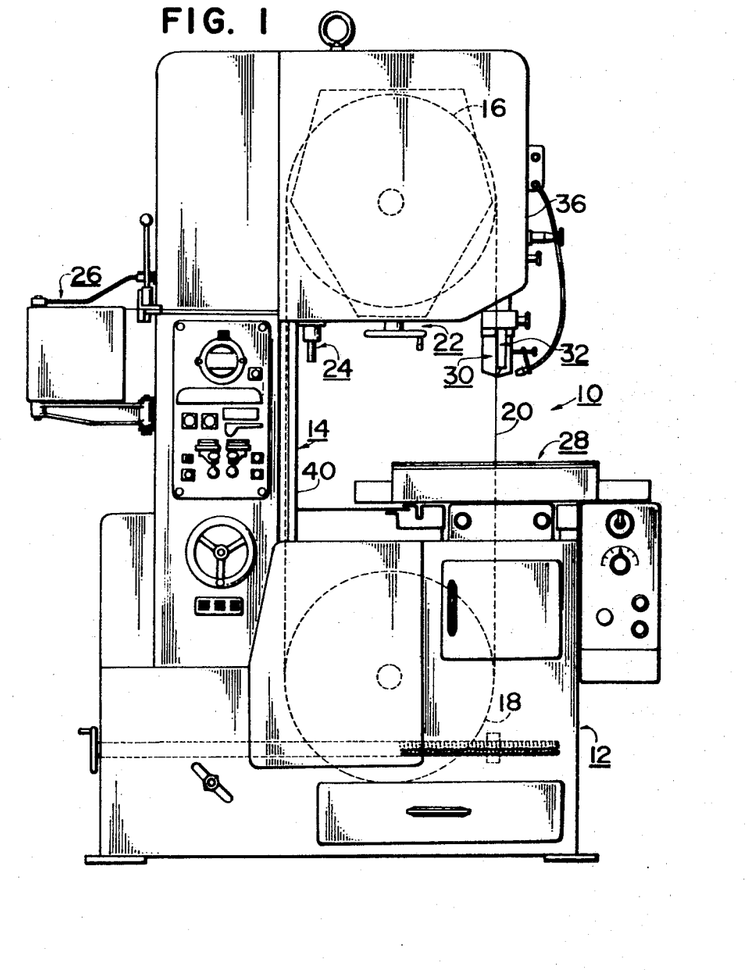
FIG. 1 is a front view showing the present machine in its entirety.
Figure 2:
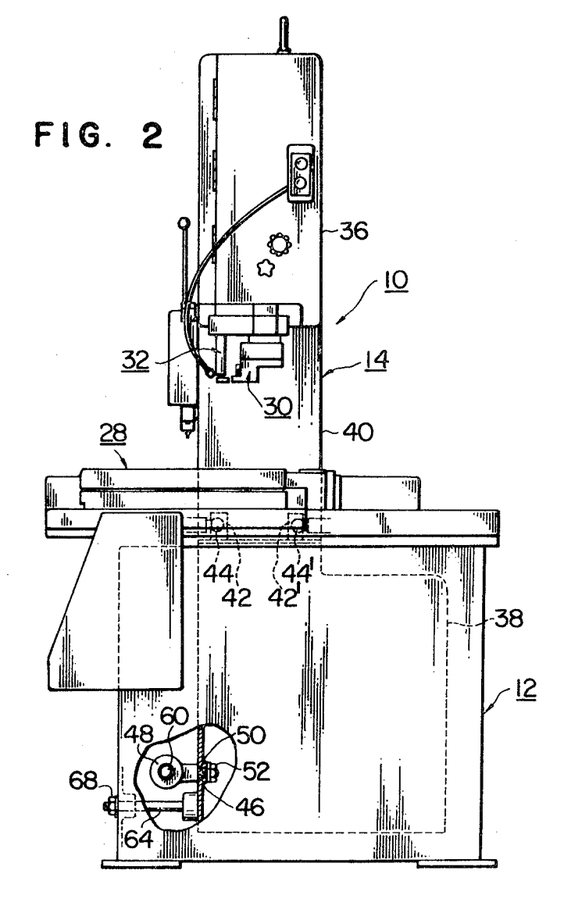
FIG. 2 is a side elevation of the machine shown in FIG. 1, shown partly in section.

As shown in FIGS. 1 and 2, a machine body 14 is tiltable with respect to a base 12, and can be secured thereto in tilted positions. A driven saw wheel 16 and a driving saw wheel 18 are enclosed within the upper and the lower parts of the machine proper 14, respectively. An endless saw band 20 is mounted on these saw wheels 16, 18, and placed under desired tension through a band-saw tensioning unit 22 fitted on the mounting portion of the driven wheel 16, and a tension indicator unit 24. A saw-container unit 26 is mounted to the machine proper 14.

An upper saw-guide unit 30 and a curve-sensing guide unit 32 are fitted on the upper part of the machine proper 14 so as to depend therefrom in the direction of a worktable 28 mounted on the upper surface of the base 12. Although not shown in FIGS. 1 and 2, a lower saw-guide unit 34 is mounted beneath the worktable 28 and in opposition to the upper saw-guide unit 30. The lower unit 34 is fitted with an automatic stop mechanism, which comes into play fully automatically upon completion of the sawing operation.

Next, each component unit of the present machine will be explained in detail.

Figure 3:
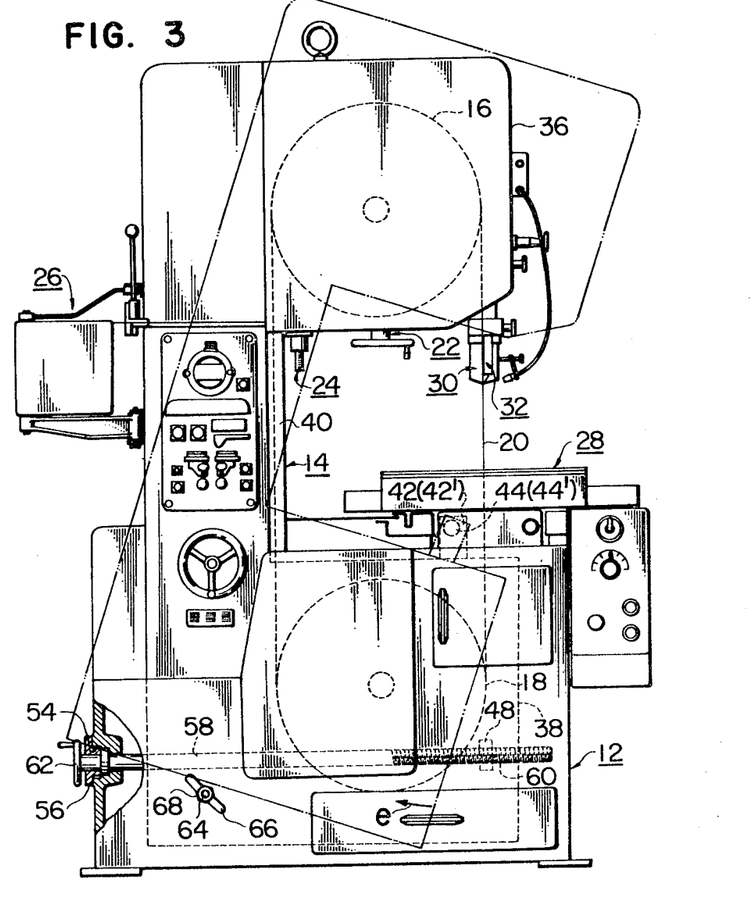
FIG. 3 is a front view, partly in section, of the tilting and fixing mechanism of the present machine, part thereof being omitted from the illustration for clarity of the drawing.

As shown in FIGS. 2 and 3, the machine proper 14 comprises an upper housing 36, enclosing driven saw wheel 16, a lower housing 38, enclosing the electric motor, not shown, for driving the saw, and the driving saw wheel 18, and an intermediate housing 40 at the connecting portion of the upper and lower housings 36, 38. The lower housing 38 is inside the base 12 and mounts a pair of support fixtures 42, 42' on its upper surface. These fixtures 42, 42' are formed with spherical receases enageable with ball joints 44, 44' fitted on the base 12, so that the machine proper 14 is carried tiltably with respect to the base 12. A piece 48 with a screw hole has a lateral projection 50 inserted into an opening 46 bored on the lower front wall of the lower housing 38, and is secured in position by means of a double row nut 52.

An adjustment shaft 58 is passed through an opening 54 bored through the left-hand wall of the machine proper 14 and held in position with a mounting fixture 56 so as to be rotatable about its axis but prevented from moving longitudinally.

The adjustment shaft 58 has on its one end a threaded portion 60 engageable with the screw hole of the piece 48, and a handle 62 on the other end. The front wall of the lower housing 38 as viewed in FIG. 3 is fitted with a screw rod 64 projected outwardly from the base 12 in passing through an oblong hole 66 thereof. A nut 68 is threadedly attached to the projecting portion of the screw rod 64 so as to be slackened or tightened, as desired.

Figure 4:
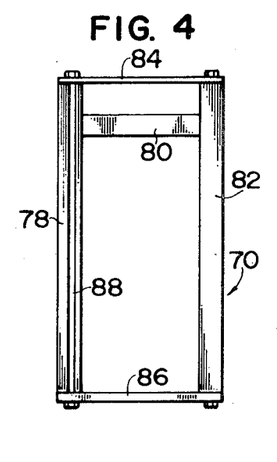
FIG. 4 is a plan view showing a frame of the worktable of the present machine.
Figure 5:
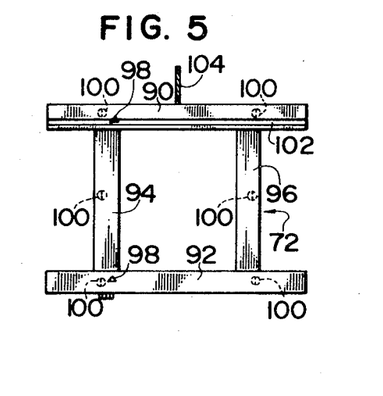
FIG. 5 is a plan view showing a block of the worktable, movable back and forth.

The worktable 28 comprises a framework 70, a block 72 movable back and forth, a block 74 movable left and right, and a ring-shaped rotary table 76. The framework 70 is formed into a rigid lattice shape from steel bar sections 78, 80, 82 and flat steel bars 84, 86, as shown in FIG. 4, and secured to the upper surface of the base 12. On the steel bar section 78, there is formed a guide slot 88 for guiding the block 72 therealong. The block 72 is formed into a rigid lattice shape from four steel bar sections 90, 92, 94, 96, as shown in FIG. 5. Guide rollers 98 on the lower faces of the bar sections 90, 92 are slidable within guide slot 88 on the frame 70 so that the block 72 can be steered accurately in its fore and aft movements.

On the lower face of the block 72, six stroke bearings 100 are fitted slidably on the bar sections 78, 82 of the framework 70 so that the block 72 is movable smoothly in said direction. On the upper face of the bar section 90, a guide slot 102 is formed transverse to the guide slot 88 for guiding the block 74. A towing guy 104 secured to the bar section 90 is connected to a towing means, such as a weight or torque motor mounted back of the flat bar 84 of the framework 70, although not shown, for controlling the movement of block 72.

Figure 6:
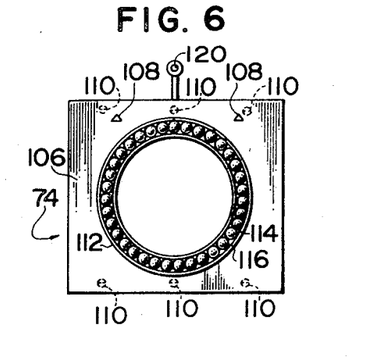
FIG. 6 is a plan view showing a block of the worktable, movable left and right.

The movable block 74 comprises a plate 106, as shown in FIG. 6. Two guide rollers 108 fitted on the lower face of the plate 106 are slidable within guide slot 102 on the bar section 90 of the lower movable block 72 so that the block 74 can be steered correctly in its left and right movements. Six stroke bearings 110 on the plate 74 are slidable on the bar sections 90, 92 of the block 72. Thus, the plate 74 is movable smoothly with respect to the block 72 in the left and right direction as viewed in FIG. 5. A guide rail 114 in the form of an annular recess 112 is provided on the upper surface of the plate 74 for guiding the rotary table 76. A number of steel balls 116 are arranged within the rail 114, and the circular portion defined by the inner race of the guide rail 112 is removed by punching.

Figure 7:
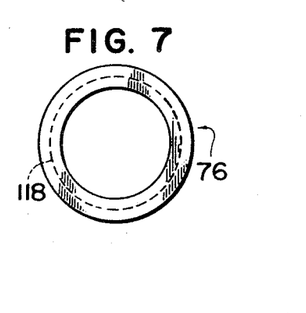
FIG. 7 is a plan view of a rotary table.

As shown in FIG. 7, the lower face of the rotary table 76 has a ring-shaped boss 118 slidably received within said guide rail 112 and sliding contacted with steel balls 116. Rotary table 76 is connected to a servo-motor 120 fitted on the block 74 through a belt, not shown, so as to be rotated in forward or reverse directions or stopped from rotation as desired. This servo-motor 120 can be controlled by the signals emitted by the curve sensing guide mechanism 32 adapted for sensing the contour of a template brazed to the workpiece M, as will be described later.

The saw tensioning unit 22 and the saw-tension indicator unit 24 will now be described in detail by referring to FIGS. 8 and 9. A support base 122 in the form of a hexagon when seen in elevation is secured in the inside of the upper housing 36. Two upper brackets 124, 124' are fitted to the upper part of the support base 122 so as to project outwardly therefrom. Similarly, two lower brackets 126, 126' are fitted to the lower part of the support base 122 so as to project outwardly therefrom and in opposition to said brackets 124, 124'. Said upper brackets 124, 124' and lower brackets 126, 126' are adapted for carrying the ends of left and right guide posts 128, 128', respectively.

Figure 8:
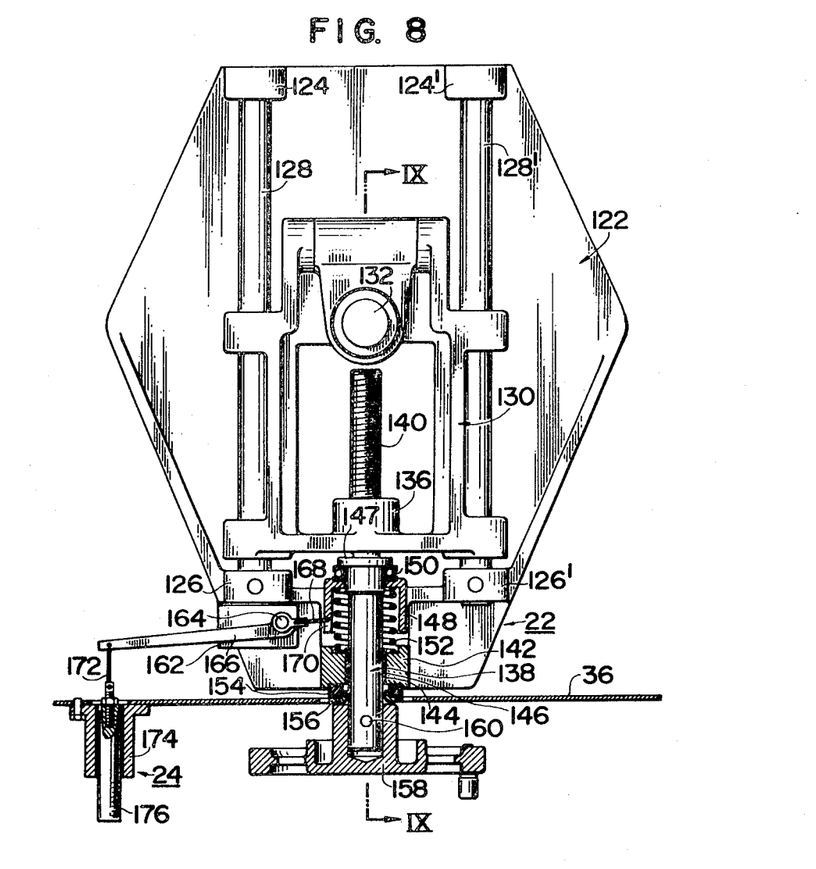
FIG. 8 is an enlarged front view of the saw-tensioning and saw-tension indicator mechanisms, shown partly in section.
Figure 9:
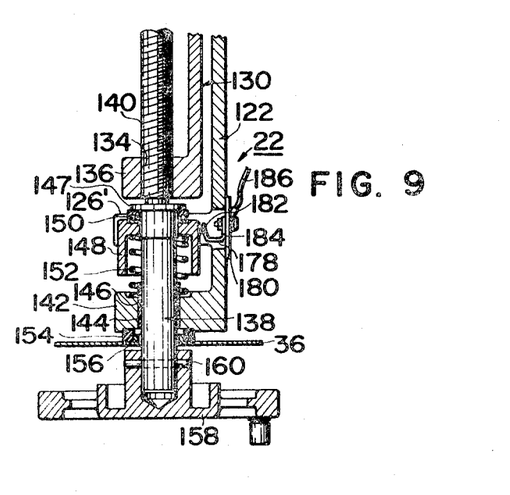
FIG. 9 is a partial cross-section taken along line IX—IX of FIG. 8.

A slider 130 in the form of # is slidably mounted on said guide posts 128, 128' and has a bearing 132 on its upper portion for carrying the driven saw wheel 16, although not shown in FIG. 8. On the lower portion of the slider 130, there is integrally formed a boss 136 having a screw hole 134 (FIG. 9).

An adjustor shaft 138 has its upper threaded portion 140 screwed into screw hole 134 on the boss 136, and has its lower portion slidably received within a hole 144 formed through a center bracket 142 projected from the lower center of the support base 122 through a smoothly ground bushing 146.

A thrust spring 150 is inserted between a flange 138 formed halfway on adjustor shaft 138, and a spring retainer 148 slidably mounted on the adjustment shaft 138. A spring 152 of a considerable spring force is mounted under compression in encircling said shaft 138 between spring retainer 148 and center bracket 142. To the lower end of the center bracket 142, a cushioning rubber piece 154 and a protector cover 156 are provided in this order and, moreover, a handle 158 is fitted to the lower end of shaft 138 by means of a pin 160.

An L-shaped metal fixture 162 is secured to the bottom of the lower bracket 126, and a lever 166 is pivotally mounted on this metal fixture 162 with a hinge pin 164. A projection 168 formed on one end of the lever 166 is engaged within a notch 170 on the lower side of the spring retainer 148 for limiting the circular movement thereof. A graduated weight or pendulum 176 is suspended from the other end of the lever 166 through a joint 172, and is slidable within a guide sleeve fitting 174.

A window 178 is bored through the support base 122 in the proximity of the spring retainer 148 and covered with an electrically insulating piece 180. An electrode 184 is mounted on the inside surface of the piece 180 so as to be brought into and out of contact with a copper rivet 182 fitted on the upper side of the spring retainer 148. A lead 186 connected to the electrode 184 is connected to a microswitch, not shown. "Low voltage" alternating current is supplied to the support base 122. The electrical wiring is so made that the saw driving electric motor ceases to operate upon abutment of the electrode 184 on the copper rivet 182.

Figure 10:
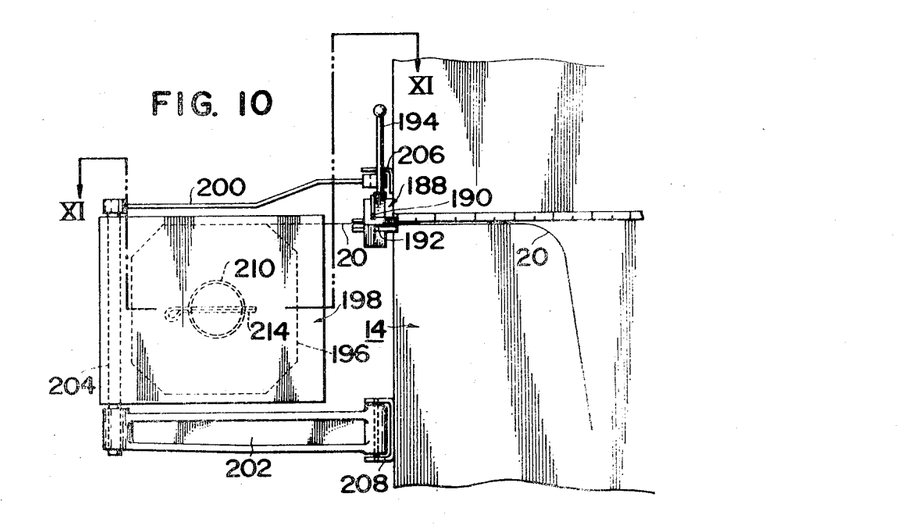
FIG. 10 is an enlarged front view showing a saw container mechanism mounted movably to the machine proper, part thereof being omitted for clarity of the drawing.
Figure 11:
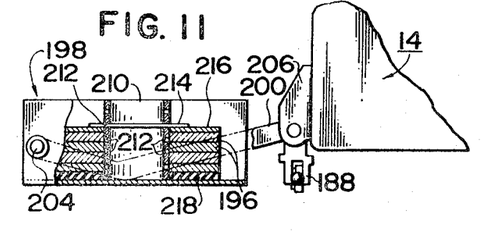
FIG. 11 is a cross-section taken along line XI—XI of FIG. 10.

The "saw blade" container unit 26 will now be explained in detail by referring to FIGS. 10, 11. A saw cutter 188 is secured to the intermediate housing 40 of the machine proper 14. The cutting is done by placing the portion of the saw 20 to be cut between a pair of cutting edges 190, 192, and depressing a lever 194. A saw casing container 198 contains one or more saw casings 196 which receives the saw band 20 wound into a spiral. The container 198 is pivotally mounted for free swivel motion about a vertical shaft 204 secured to an upper rotary support arm 200 and a lower rotary support bracket 202. Said arm 200 and bracket 202 are pivotally mounted at the ends remote from shaft 204 to brackets 206, 208 secured to the machine proper 14.

Figures 12, 13:
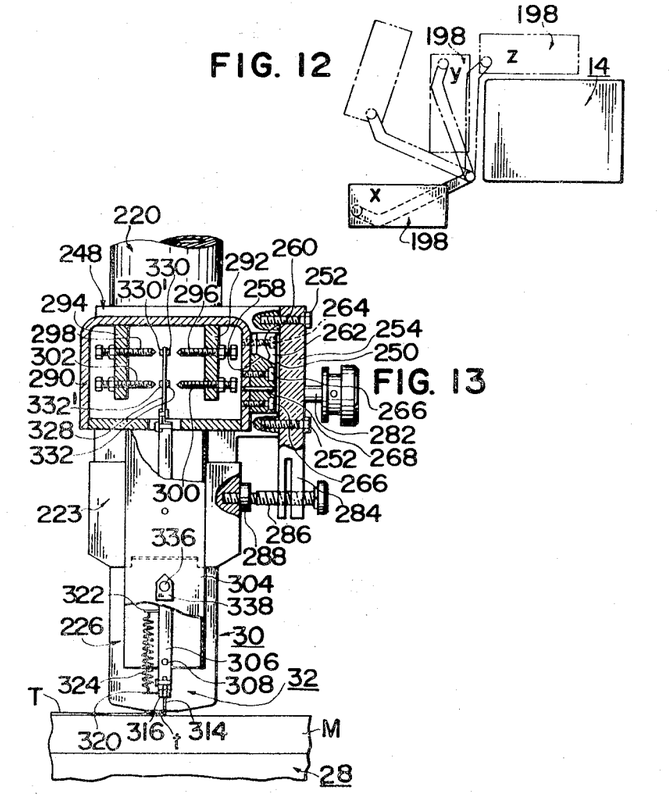
FIG. 12 is an explanatory plan view showing schematically the various positions of the saw-container mechanism relative to the machine proper.
FIG. 13 is an enlarged front view, partly in section, of the upper saw-guide and the curve-sensing steering mechanisms, part thereof being omitted for clarity of the drawing.

Thus, by the combined function of the two pivot devices, the "saw case" container housing 198 can be moved to the desired horizontal position, as shown in FIG. 12, such as position *x* wherein the saw 20 is cut, or positions *y*, *z* wherein the saws are in storage. Housing 198 is comprised of a side wall section, a top wall section and a bottom arranged into a U-shaped framework. A cylinder 210 is secured vertically to the center of the top and bottom by welding. Each saw casing 196 is housed within the container housing 198 with the inner cylinder of the saw casing 196 fitting on the cylinder 210.

Many kinds of saws 20 with varying saw widths are used for cutting operation. Thus, several kinds of saw casings 196 are contained within the housing 198 so that the desired saw 20 can be selected therefrom. The saw casing 196 contained within the housing, with its cylinder fitting the cylinder 210, is retained in position with a pin 214 passed through pin holes 212 formed on the diametrically opposite wall portions of the cylinder 210. A number of pin holes 212 are provided in this way at intervals of several millimeters so as to correspond to the overall thickness of the saw casing 196. Preferably, in order to secure saw casing 196 firmly with respect to the cylinder 210, a presser bar 216 is interposed between the pin 214 and the saw casing 196, and an elastic body 218 is placed on the bottom surface of the housing 198.

Figure 14:
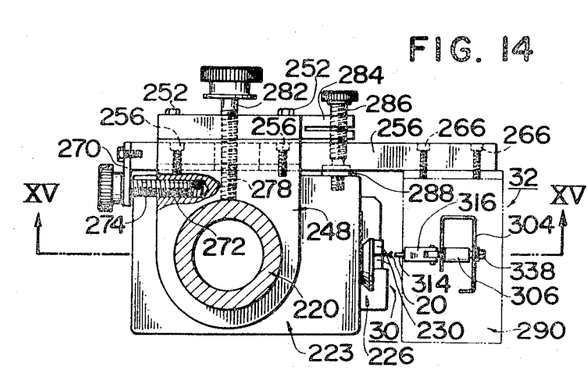
FIG. 14 is a plan view, partly in section, of the mechanisms shown in FIG. 13, part thereof being omitted for clarity of drawing.

Next, an upper saw-guide unit 30 and a curve-sensing guide unit 32 will now be explained in detail by referring to FIGS. 13, 14 and 15. The upper saw-guide unit 30 comprises an upper guide post 220, a mounting section 223 and a guide block 226. Said upper guide post 220 is secured to the upper housing 36 of the machine proper 14 so as to be depending therefrom towards the worktable 28 for free rotation and vertical movement and secured in the desired position.

Figure 15:
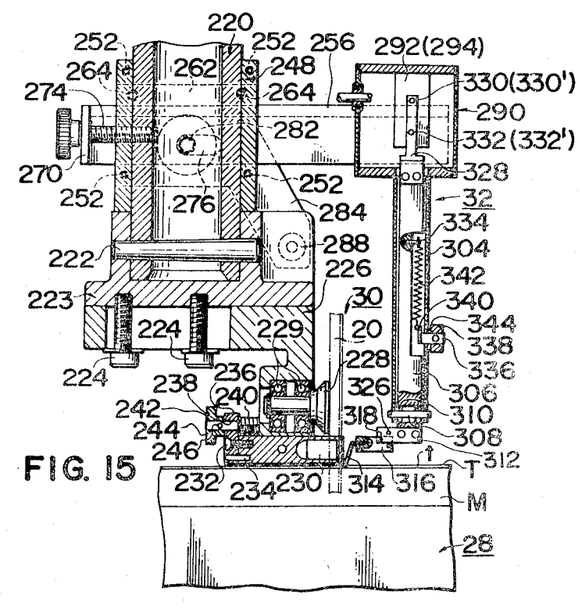
FIG. 15 is a cross-section taken along line XV—XV of FIG. 14.

To the lower surface of the mounting portion 223, secured with a taper pin 222 to the lower part of the upper guide post 220, the guide block 226 is mounted with a bolt 224 so as to be movable back and forth with respect to the travelling direction of the saw 20 or in the left and right direction as viewed in FIG. 15, or secured in the selected position. A saw back-up roller 228 in the form of a mushroom is rotatably mounted to the front side of the guide block 226 with a double-row bearing 229, thereby to regulate the deviation of the saw 20 towards the rear.

A pair of saw holders 230 are mounted beneath said back-up roller 228 so as to be slidable back and forth with respect to the running direction of the saw 20. The rear portion(s) of the saw holder project into the lower rear space of the guide block 226. To the projected end portion is fitted a transfer plate 236 through screws 232 and knock pins 234. A screw and 240 has its head portion 242 passed through opening 238 bored on the top of the plate 236. The threaded portion of the screw rod 240 is threadedly fixed to the rear portion of the guide block 226. A knob 244 is fitted to the projected head portion 242 through a pin 246.

Referring now to the position adjustment system of the curve sensor unit 32, a support block 248 is slidably mounted on the upper guide post 220 above the mounting portion 223. A back cover 254 is secured to the support block 248 with several bolts 252 to stop up a recessed portion 250 on its rear side wall and the free end of the recessed portion 250. One end of a bracket arm 256 is received between said recessed portion 250 and said back cover 254, so that the arm 256 is slidable longitudinally.

The bracket arm 256 has an inclined upper end face 258 engageable with an inclined upper surface 260 of a block 262 which is secured to support block 248 by means of an embedded bolt 264 in the space defined by said recess 250 and back cover 254. By tightening the bolt 264 to a desired degree, block 262 is moved towards the inside of the support block 248 with its inclined surface 260 sliding pressingly on the inclined end face of bracket arm 256. In this way, the bracket arm 256 is brought into pressure contact with the "right-hand wall of the recess 250, as viewed in FIG. 13" and the lower wall thereof, and thus held firmly but slidably lengthwise without any wobbling by its pressure contact with said right-hand and lower walls of the recess 250 and said inclined surface 260.

A curve sensing unit 32 is mounted with several inserted bolts 266 and knock pins 268 to the free end of bracket arm 256 extended from support block 248 towards the front of the saw 20. A plate 270 is secured to the other end of this bracket arm 256, extended transverse to and back of support block 248. An adjustment screw piece 274 is passed through said plate 270 and threaded into a tapped hole 272 of the support block 248. A set bolt 282 inserted into a through oblong hole 276 of the back cover 254 and bracket arm 256, and screwed into a tapped hole on the support block 248, abuts at its end portion with the periphery of the upper guide post 220.

The support block 248 can be positioned "relative to the upper guide post 220" by tightening or loosening this set bolt 282. The lower portion of the back cover 254 has an arm-like extension 284 extended obliquely towards the front side. A further adjustment screw piece 286 is screwed to the foremost part of this arm-like extension 284, and the free end thereof can thus be brought into or out of contact with a washer 288 fitted on the back side wall of the mounting portion 223.

As shown in FIG. 13, a casing 290 of the curve-sensing guide mechanism 32 secured to the foremost part of the arm 256 has two enclosed blocks 292, 294 made from non-conductive material. These blocks are placed a suitable distance apart from each other and attached to the top plate so as to be depending vertically therefrom. On the opposing sides of these blocks 292, 294, there are fitted two upper electrodes 296, 298 and two lower electrodes 300, 302 adjustable in opposition to each other. These upper electrodes 296, 298 are connected to the terminals c, a in the wiring diagram of FIG. 20 through suitable leads, not shown, while the lower electrodes 300, 302 are connected to the terminal d of the same figure through leads, also not shown.

A channel steel section 304 depending from the lower surface of the casing 290 encloses an operating lever 306 made from "non-conductive" material and mounted to a lower support shaft 308 through a double-row miniature bearing 310 for pivoting left and right when viewed in FIG. 13. A block 316 mounting a feeler needle 314 is pivotally mounted with a shaft 318 to a mounting block 312 fitted to the lower end of the operating lever 306.

A spring 324 is mounted under tension between a pin 320 inserted on the periphery of the block 316, and a pin 322 inserted on the periphery of the operating lever 306, as shown in FIG. 13. Said block 316 is maintained in a substantially horizontal position, when a stopper pin 326 inserted into an opening on the mounting block 312 abuts on the block 316. When the stopper pin 326 is removed, block 316 is pivoted upwards about shaft 318 together with feeler needle 314 under the action of spring 324.

Figure 20:
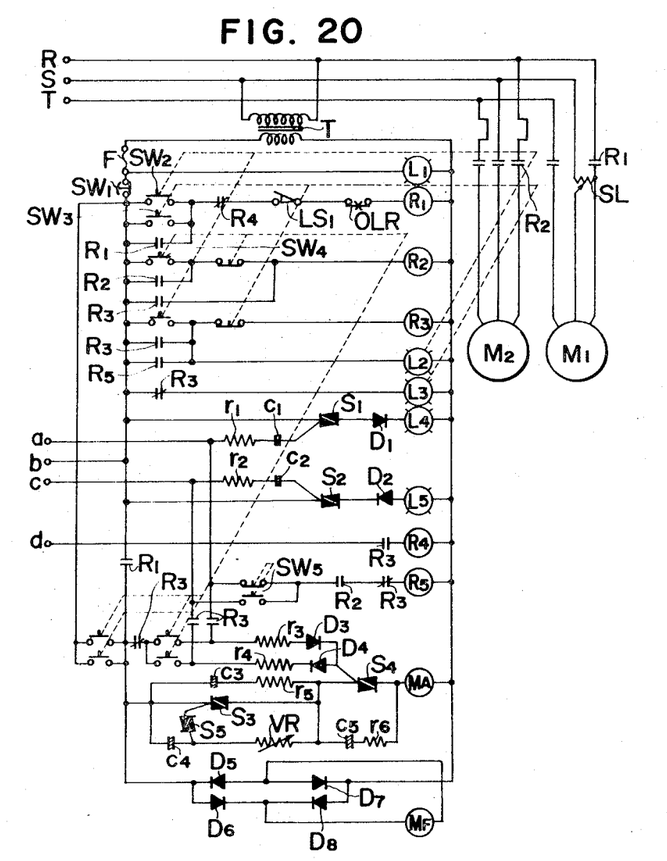
FIG. 20 is a wiring diagram of the electrical circuit for operating the worktable.

A metallic plate 328 connected with terminal b as shown in the wiring diagram of FIG. 20 through lead is secured to the upper end of the operating rod 306. This metallic plate 328 is passed through the bottom of casing 290 and protruded into a space defined by the upper electrodes 296, 298 and the lower electrodes 300, 302. As shown in FIG. 13, contact pieces 330, 330' and contact pieces 332, 332' are fitted on both sides of the metallic plate 328 in opposition to said upper electrodes 296, 298 and lower electrodes 300, 302.

The operating lever 306 has a recess in its center zone, and a spring 342 is mounted under tension between a pin 334 secured to the upper part of the recess and an arm 340 of a selector lever 338 fitted to the lower part of the recess through a shaft 336. A corrugated washer 344 is interposed between the selector lever 338 and the channel section 304, so that the selector lever is associated with some degree of frictional resistance with the channel section 304. Thus, when the selector lever 338 is turned towards right or left in FIG. 13, the upper portion of the operating lever 306 is tilted in the same direction.

Next, the details of the lower saw guide mechanism 34 and the automatic stop mechanism will be explained by referring to FIGS. 16, 17, 18 and 19. A support base 348 with a U-shaped cross section is secured to a frame 346 of the lower housing 38 of the machine proper 14 by means of several bolts 350. A slider piece 352 is placed vertically slidably within a recess of the support base 348 with a gap 354 between the end face of a leg portion 355 and the interior surface of the recess opposite to said leg portion 355. An engaging piece 356 secured to support base 348 by a bolt 359 has an inclined surface 357 engageable with an inclined end surface of the leg portion 355.

Figure 16:
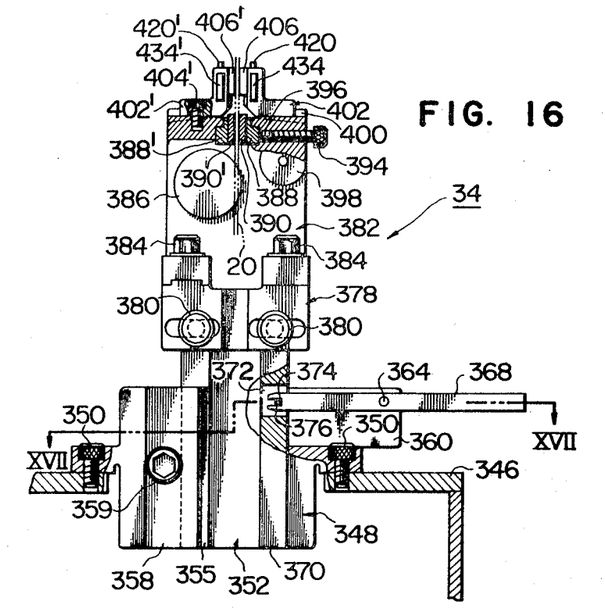
FIG. 16 is a front view, partly in section, of the lower saw-guide and automatic stop mechanisms.
Figure 17:
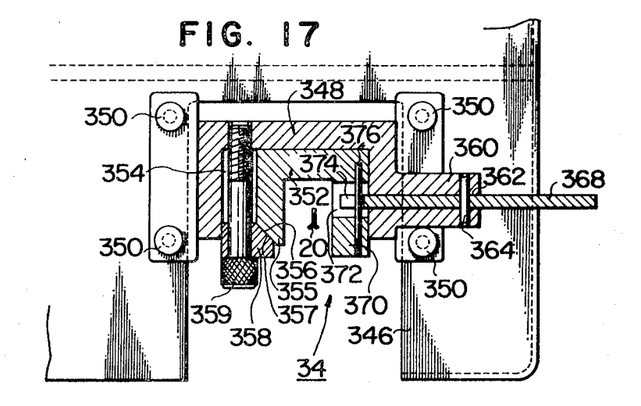
FIG. 17 is a cross-section taken along line XVII—XVII of FIG. 16.

Thus, the slider piece 352 can slide vertically within the recess of the U-shaped support base 348 and be secured to the desired position. An operating lever 368 is inserted in a groove 362 of a bracket 360 extending from one side of the support base 348, and pivotably mounted about a pin 364. Said lever 368 has an end portion extending into a hole 372 bored through another leg portion 370 of the slider piece 352. Said end portion is bifurcated at 374 for engaging with a shifter pin 376 secured inside hole 372.

A movable block 378 is mounted to the top of the slider piece 352 by bolts 380 so as to be slidable in the left and right direction, when viewed in FIG. 16, and be secured to the desired position. A saw guide block 382 is mounted on the top of the slider piece 352 with bolts 380 so as to be slidable left and right when viewed in FIG. 16, and be secured in the desired position.

This saw guide block 382 carries a saw back-up roller 386 adapted for prevention of the saw deviation and for simultaneous rotation with the travelling saw 20. A pair of saw holders 388, 388' are slidably mounted within a vertical hole formed on the saw guide block 382 on top of the back-up roller 386. Diamond tips 390, 390' are brazed to the opposing sides of saw holders 388, 388'. These saw holders 388, 388' are coupled to each other with a knock pin (FIG. 18) so that they can project downwards the same distance from the top wall of the block 382.

Figure 18:
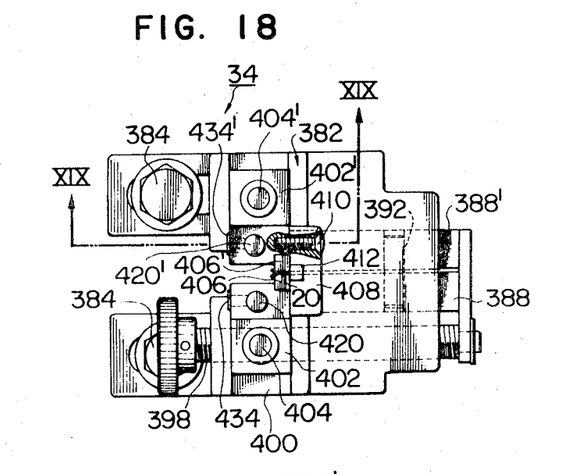
FIG. 18 is a enlarged plan view, partly in section, of the mechanisms shown in FIG. 16, part thereof being omitted for clarity of drawing.

The saw holder 388 is urged towards the holder 388' by means of an elastic body 396 clampedly held between the side wall of the holder 388 and an adjustment screw 394 threaded to a screw hole on the side wall of the block 382. Thus, the saw 20 is held in position by means of these holders 388, 388'. An adjustment screw 398 is provided on the saw guide block 382, as shown in FIG. 18, for shifting the positions of the saw holders 388, 388' along the length of the saw 20.

Supplementary guide blocks 402, 402' are inserted into a groove 400 provided on the top surface of the saw guide block 382 and adjustably mounted by bolts 404, 404' so as to have a gap equal to the thickness of the saw 20. Diamond tips 406, 406' are brazed to the opposing sides of these blocks 402, 402'. A back block 408 is secured to the rear sides of the blocks 402, 402' "in FIG. 18" with two bolts 410. A diamond tip 412 is inserted and brazed to the center of the top wall surface of the back block 408 opposite to the gap between said guide blocks 402, 402'.

Figure 19:
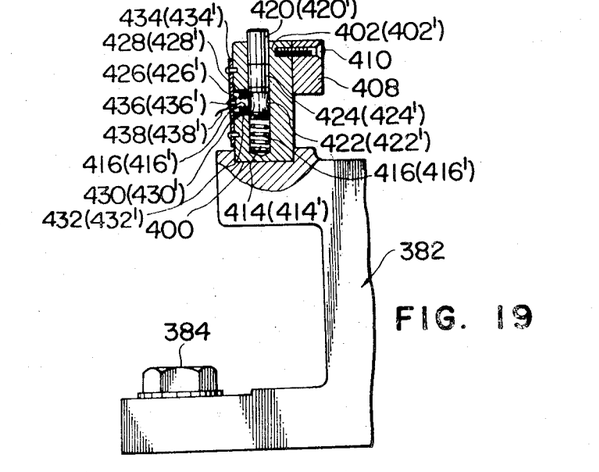
FIG. 19 is a cross-section taken along line XIX—XIX of FIG. 18, part thereof being omitted.

As shown in FIG. 19, deep holes 414, 414' are bored from the top of these guide blocks 402, 402'. Springs 416, 416' inserted into these holes 414, 414' act upon pins 420, 420' made from insulating materials, such as synthetic resins, so that the upper ends thereof are projected outwardly from the upper surfaces of the blocks 402, 402'. The lower part of each pin 420, 420' is formed with recessed zones 422, 422' and covered fixedly with metal tubes 424, 424' above said zones 422, 422'. Holes 426, 426' are bored from the front walls of the guide blocks 402, 402' so as to be opened into the portions of deep holes 411, 411' receiving said recessed zones 422, 422'.

Tubular segments 428, 428' made from insulating material are inserted into these holes 426, 426' so as to cover the peripheral zones. Actuators 430, 430' made from metallic material are inserted for direct contact with the recessed zones 422, 422'. Furthermore, a number of elastic bodies 432, 432' are inserted and covered with insulating sheets 434, 434'. These insulating sheets 434, 434' are provided with terminals 436, 436' electrically connected with said elastic bodies 432, 432'. These terminals are connected through leads 438, 438' to the automatic stop circuit for stopping the machine operation, and are supplied with a "low voltage" electric current such as of the order of 20 V.

In the following, the operation of cutting a press punch and a mating die from a workpiece (shape steel) will be explained as a typical operation performable with the machine 10.

Figure 21:
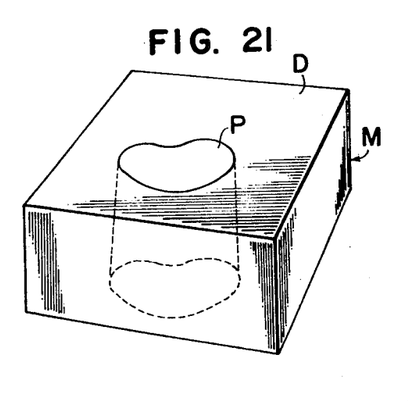
FIG. 21 is a perspective view showing a shape steel being machined for producing a punch and a die simultaneously, in a typical operation performable with the present machine.
Figure 22:
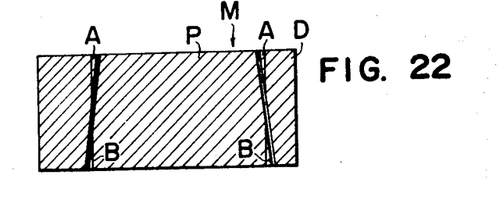
FIG. 22 is a cross-section of the workpiece shown in FIG. 21.
Figure 23:
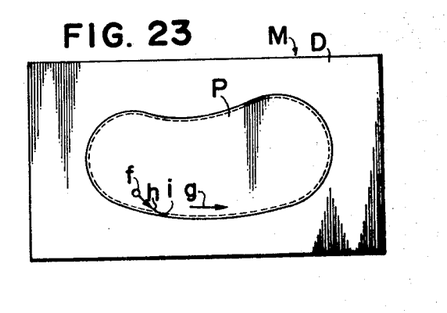
FIG. 23 is a plan view of the workpiece shown in FIG. 21.

In this case, the travelling saw 20 is tilted about 10° with respect to the workpiece M for cutting from workpiece M a trapezoidal block having a larger lower area than the upper area (see FIGS. 21, 22 and 23). The portions shown at A, B are then removed, and the blocks D and P are subjected to heat treatment and processed into a die and a punch, respectively.

First, the nut 68 is slackened and handle 62 turned manually, for tilting the machine proper a desired angle relative to the base 12. The piece 48 is pulled in a direction shown by the arrow mark e (see FIG. 3), through the adjuster shaft 58, and the machine proper 14 is inclined, as shown by the imaginary line, with ball joints 44, 44' as its center. When the machine proper has been tilted to the desired angle, it is secured to the base 12 in the thus inclined position by tightening the nut on the screw rod 64.

When setting the saw 20 between the driven wheel 16 and the driving wheel 18, the workpiece M is secured on the rotary table 76 of the worktable 28, and the template T stuck at a desired position on the workpiece M. Then, the "saw casing" container 198 of the "saw container" mechanism 26 is moved to the position x shown in FIG. 12 from its positions y, z in the same figure.

The desired saw 20 is taken out from the casing 196 and placed on driven wheel 16 and driving wheel 18 in passing through a starting hole bored on the workpiece M. The saw 20 is then pulled out to the desired length and cut by the saw cutter 188. The two ends of the saw are welded to each other to form an endless band. Preferably, a device for measuring the desired length of the saw 20 may be provided somewhere in the vicinity of the saw cutter 188.

When the saw 20 is placed on both the driven wheel 16 and the driving wheel 18, the handle 158 of the saw tensioning unit 22 is turned manually. The slider 130 is thus raised in its position. But, as the spring force of the spring 152 is selected large enough to prevent spring compression under the weights of the driven wheel 16, slider 130, adjustment shaft 138, and handle 158, the spring retainer 148 is held in position, and the lever 166 will not operate.

As the handle 158 is turned further with the resulting elevation of the slider 130, tension starts to be developed on the saw 20, thus causing the spring 152 to be compressed. Adjustment shaft 138 slides downwards within hole 144 of the center bracket 142, for shifting the spring retainer 148 downwards. Thus, the pin 168 engaging into the notch 170 of the spring retainer 148 causes the lever 166 ro pivot about hinge pin 164 as a center, thus lifting the weight 176. As the spring 152 is compressed in function of the produced saw tension, with resulting pivoting of the lever 166, the saw 20 can be placed under desired tension by reading the graduation on the weight 176 aligned with the lower edge of the guide sleeve 174.

When the saw 20 is tensioned, spring retainer 148 slides to the lower position, so that the copper rivet 182 is moved out of contact with electrode 184. Thus, when the starter switch for the saw driving motor is pressed down, the saw 20 is set into rotation through the driving wheel 18 for performing the cutting operation. But, when the saw 20 is broken through some accidents, the adjustment shaft 138 is suddenly elevated in its position under the restoring force of the compressed spring 152. Thus, the upper end surface of the handle 158 impinges on the ring 156, though the impact force is absorbed by the cushioning rubber piece 154. The copper rivet 182 of the spring retainer 148 is brought into contact with the electrode 184, and the associated microswitch is set into actuation so as to open the circuit of the saw driving motor and stop the motor operation.

Thus, when the saw 20 is not placed under tension, the spring retainer 148 remains in position, as the weight of the upper saw mechanism is counterbalanced by the spring force of the spring 152 even when the handle 158 is turned manually and the slider 130 elevated in its position. Therefore, the tension indicator unit 24 points to zero position. When tension is produced on the saw 20, the spring 152 is compressed to a corresponding degree, so that the proper tension is indicated on the tension indicator unit. In this way, the saw can be easily and positively tensioned to the optimum value.

Then, the upper guide post 220 of the upper saw guide mechanism 30 is adjusted in its height, and the guide block 226 moved leftwards or rightwards in FIG. 15 with respect to the mounting portion 223 and secured to the proper position. The saw 20 is guided and maintained in its position through the saw holders 230 and saw back-up roller 228 fitted on the guide block 226. Then, the set bolt 282 is slackened, and the support block 248 rotated with respect to the upper guide post 220 approximately to a position wherein the feeler needle 314 fitted on the operating lever 306 is moved close by the front side of the saw 20.

Then, the adjustment screw 274 is turned manually so as to project the bracket arm 256 outwardly from support block 348 for fine adjustment of the position of the feeler needle 314 with respect to the saw 20 in the left and right direction when seen in FIG. 15. Adjustment screw 286 is also turned manually so that the foremost part thereof abuts on the washer 288 of the mounting portion 223 and the support block 248 itself rotates slightly about guide post 220 for fine adjustment of the position of the feeler needle 314 with respect to the saw 20 in the left and right direction in FIG. 13. With the various parts thus adjusted, the set bolt 282 is again tightened.

Then, the slider piece 352 of the lower "saw guide" unit 34 is moved vertically with respect to the support base 348 and secured at the proper position. Then, the movable guide block 378 and the saw guide block 382 are adjusted to their proper positions with respect to the saw 20. The clamping force exerted by diamond tips 390, 390' on the saw 20 is then adjusted with adjustment screw 394, and the relative position of these tips is then finely adjusted through adjustment screw 394.

As the supplementary guide blocks 402, 402' and the back block 408 are provided integrally on the top of the saw guide block 384, these blocks can be adjusted in their positions simultaneously with the adjustment of the saw-guide block 382.

Supposing that the saw 20 cuts along the boundary wall surface $t$ of the template T counterclockwise or in the direction shown by arrow $g$ (FIG. 23), the selector lever 338 is tilted to the right so that the operating lever 45 is pivoted about support shaft 308 under the force of spring 342, and the feeler needle 314 abuts on the boundary wall $t$ of the template T.

At this time, saw 20 is received inside a starting hold (FIG. 23) spaced from said boundary wall of the template T, the top portion of the operating lever 306 will be tilted towards the right in FIG. 13, so that the contacts 330, 332 are kept in abutment with the upper and lower electrodes 296, 300, respectively.

Then, a machine is started manually by depressing the selector switch $SW_5$ and a switch $SW_3$, as shown in the wiring diagram of FIG. 20. In this way, a relay $R_1$ is energized and kept in the energized state by self-hold so that a torque motor $M_1$ on the worktable 28 for receding the latter is set into continuous into operation continuously for receding the table. When a switch $SW_2$ is depressed, a relay $R_2$ is energized and kept in the energized state by self-hold action so that a saw-drive motor $M_2$ is set into operation continuously for driving the saw 20 along a circular passage.

When a switch $SW_4$ is depressed, current is supplied to armature $M_A$ of the DC motor for rotation of the table 76, so that the rotary table of the worktable 28 is caused to turn rightwards or leftwards. Thus, the saw 20 is now forced to move in a definite sense as shown at $h$ in FIG. 23. When the direction of movement of the saw 20 has been regulated in this way the manual pressure exerted on the switch $SW_4$ is released. The rotary table 76 is now caused to recede, without rotational movement, so that the saw 20 cuts substantially along a straight line in the above-mentioned sense.

When the saw 20 has reached the point $i$ in FIG. 23, the feeler 314 abuts on the boundary wall $t$ of the template T and is thereby urged to move towards the right in FIG. 13, so that the contacts 330, 332 are detached from the upper electrode 296 and the lower electrode 300, respectively, while the contact 330' abuts on the upper left electrode 298. When the contact 330' engages the upper electrode 298, a relay $R_5$ is energized, with resulting energization of a relay $R_3$. Thus, a circuit for automatic follow-up movement of the worktable 28 comes into operation.

Thus, when contact 330' engages with upper electrode 298, rotary table 76 is turned leftwards and feeler 314 is caused to move in the direction away from the boundary wall $t$ of the template T. When the feeler is detached excessively from said boundary wall, the contact 330 will engage with the upper right electrode 296 for causing the rotary table 76 to turn rightwards. In this way, the rotary table is turned leftwards or rightwards, following the contour of the template T faithfully for carrying out the automatic machining operation.

When an acute curve, such as 300°, is encountered, the rotational movement of the rotary table will occasionally be retarded as compared to the saw movement. In such an instance, not only the contact 330 engages upper electrode 296 but contact 332 will engage lower electrode 300, due to the considerably inclined position assumed by the operating lever 306, thus energizing a relay $R_4$ and returning the relay $R_1$ to the unenergized state. Thus, the automatic follow-up circuit is opened and the machine operation brought to a stop for automatically preventing an error from occurring.

When the saw 20 has finished its automatic cutting operation on the workpiece M, the block removed from the workpiece, which should prove to be the punch P is dropped and impinges on the pin 420 or 420' projecting from the upper surface of the supplementary guide blocks 402, 402', thus causing the pin 420 or 420' to be lowered against the force of spring 416, 416'. With the pin 420 or 420' thus lowered, actuator 430 or 430' is detached from recessed zones 422 or 422' and brought into contact with metallic tube 424 or 424' encircling said pin 420 or 420', respectively. Thus, the electrical connection from the lead 438 or 438' to the supplementary guide block 402 or 402' through terminal 436 or 436', conducting elastic body 432 or 432', actuator 430 or 430', and metallic tube 424 or 424', is established, so that the operation stop circuit is started and the machine operation stops immediately.

No further description or explanation of FIG. 20 is deemed necessary which constitutes a wiring diagram, with conventional circuit and switching elements, of the electrical circuit for operating the worktable 28. Beyond the explanations given somewhat earlier it should be noted that a conventional three-phase mains supply is provided with leads R, S and T; a transformer T feeds the circuit with a reduced voltage, for control purposes, while motors $M_1$ and $M_2$ are fed from the mains upon actuation of the normally open contacts $R_1$, $R_2$ shown with conventional symbols; for motor $M_1$, adjustment is provided by way of an optional control SL.

A safety stopping switch $SW_1$ is provided in a conventional manner to interrupt the control circuit, if necessary; a fuse F is preferably placed in the circuit before this switch. The other switches, described in the preceding specification, are shown with their "ganged" contact pairs and associated signal lamps $L_1$ through $L_5$. An overload relay is shown at OLR; $D_1$ through $D_8$ are diodes, while $C_1$ 1 through $C_5$ are capacitors, $r_1$ through $r_6$ resistors, and $S_1$ through $S_5$ further electrical circuit elements, e.g., bi-directional AC switches, so-called Triacs.

The operation of the straightforward circuitry will no doubt be clear to those skilled in the art and will not require explanations beyond those given in the preceding specification.

What We Claim Is :

1. An automatic contour machine comprising, in combination, a stationary base (12), a machine body (14, 36, 38) pivotable with respect to said base and including means (64 to 68) for immobilizing the same in various positions, said machine body further including an upper housing (36), a lower housing (38) and a housing (40) intermediate the two latter, a stationary worktable (28) mounted on said base about the same height as said intermediate housing, means (16, 18) in said upper and said lower housings for rotatably supporting a band saw (20) and the like cutting tool for pivotal movement together with said machine body, including said housings, in a plane perpendicular to the face of the band saw, said supporting means including a pair of wheels (16, 18) for guiding the band saw, drive means for operating the same, said lower housing being lodged and pivotable within said base, the latter including, at a level above said lower housing but below said worktable, a pair of ball-joint type supports (44, 44') about which can pivot a pair of socket-type fixtures (42, 42') secured to the upper surface of said lower housing, and means (46 to 62) for providing an adjustable and reproducible pivotal relationship of said machine body with respect to said base.

2. The automatic contour machine as defined in claim 1, further comprising saw storage means (26, 196, 198, 202) in said machine body (14), including a support (202) pivoted to said machine body, a container (198) pivoted to said support, and at least one casing (196) in said container for lodging therein the band saw (20) wound in at least one spiral, and saw cutter means (188) on said machine body, to which the band saw can be extended from said at least one casing.

3. The automatic contour machine as defined in claim 1, further comprising saw tensioning means (22) including means (130) for carrying the driven one (16) of said wheels (16, 18), a boss member (136) formed on said carrying means, and a rotatable and reciprocable adjustment shaft (138) threadedly engaging a hole (134) in said boss member for adjusting the position of said driven wheel and thereby tensioning the band saw (20).

4. The automatic contour machine as defined in claim 3, wherein said saw tensioning means (22) includes a support (122) secured to said machine body (14) or said carrying means (130), which latter is in the form of a slider with freedom of movement in a direction parallel to the extension of said support but prevented from rotation with respect thereto, guide means (128, 128') for said slider, a spring retainer (148) slidably mounted on said shaft (138) and a strong spring (150) clamped between said retainer and a portion (142) of said support for biasing said shaft.

5. The automatic contour machine as defined in claim 1, wherein said worktable (28) includes a framework (70), a pair of blocks (72, 74) associated with said framework, adapted for sliding movement in respective directions perpendicular to each other, a rotary table (76) mounted on one (74) of said blocks, and drive means (120) for optionally and selectively rotating said rotary table in either direction.

6. The automatic contour machine as defined in claim 5, further comprising at least one pair of spaced-apart actuator means, one of which effects forward rotation of said rotary table (76) and the other reverse rotation, an automatic follow-up mechanism placed between and operatively connected with said actuator means, said mechanism including a feeler (314) operative to move said rotary table in either direction when brought into contact with said actuator means through operation of said follow-up mechanism.

7. The automatic contour machine as defined in claim 6, wherein two pairs of said actuator means are provided, one pair effecting both the forward and the reverse rotation of said rotary table (76) and the other pair stopping said drive means for the rotary table and the movement of the band saw (20), and further comprising two members operatively connected with said feeler (314), interposed between said pairs of actuator means, and engageable with respective pairs thereof.

8. The automatic contour machine as defined in claim 1, further comprising saw guide means (30, 34) secured to said machine body (14) with freedom of movement in all directions with respect to the running direction of the band saw (20), including means (402, 404, 406, 402', 404', 406') for clampedly engaging opposite sides of the band saw with freedom of slight adjustment in the running direction.

9. The automatic contour machine as defined in claim 8, wherein said saw guide means (30, 34) further includes a support (348) slidably secured to said machine body (14), a slider (352) slidable at least partly along said support, and a saw guide block (382) fitted to said slider for supporting said engaging means (402, 404, 406, etc.).

10. The automatic contour machine as defined in claim 9, further comprising an automatic stop mechanism including electrical and mechanical elements, operatively associated with said saw guide means (30, 34) for stopping the sawing operation.

* * * * *